C. G. BLOOMER, Jr.
COVER HINGE.
APPLICATION FILED MAY 11, 1909.

935,087.

Patented Sept. 28, 1909.

WITNESSES:
C. T. Hannigan
George H. McLaughlin

INVENTOR:
Charles G. Bloomer Jr.
By Horatio E. Bellows
Attorney

UNITED STATES PATENT OFFICE.

CHARLES G. BLOOMER, JR., OF CRANSTON, RHODE ISLAND.

COVER-HINGE.

935,087.  Specification of Letters Patent.  Patented Sept. 28, 1909.

Application filed May 11, 1909. Serial No. 495,243.

*To all whom it may concern:*

Be it known that I, CHARLES G. BLOOMER, Jr., a citizen of the United States, residing at Cranston, in the county of Providence and State of Rhode Island, have invented certain new and useful Improvements in Cover-Hinges, of which the following is a specification.

My invention relates to hinge connections for the covers of tea and coffee pots and other similar receptacles.

The essential objects of my invention are to provide a cover connecting means which shall permit the cover to be readily removed completely from the receptacle for facilitating the cleansing of the parts; also to insure the removable cover against accidental disengagement when the cover is backwardly turned or the receptacle unusually positioned; also to attain these ends by a structure which may be quickly and cheaply manufactured applied and operated and have a sightly appearance.

To the above ends essentially my invention consists in the novel construction and combination of parts hereinafter described and claimed.

Figure 1:
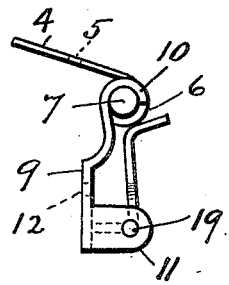
Figure 2:
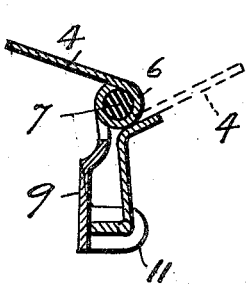
Figure 3:
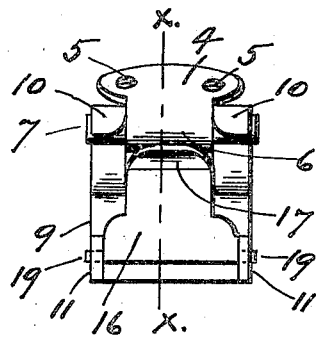
Figure 4:
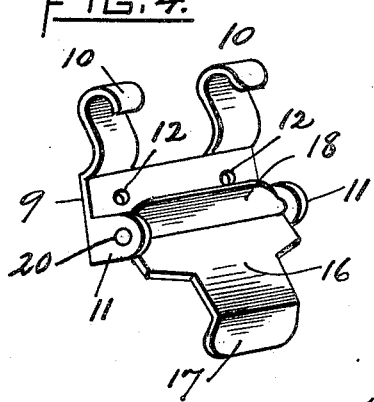
Figure 5:
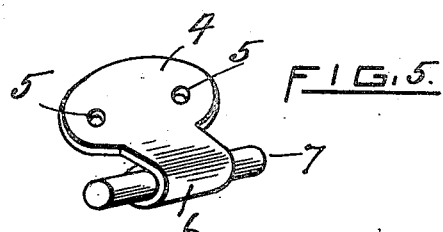
Figure 6:
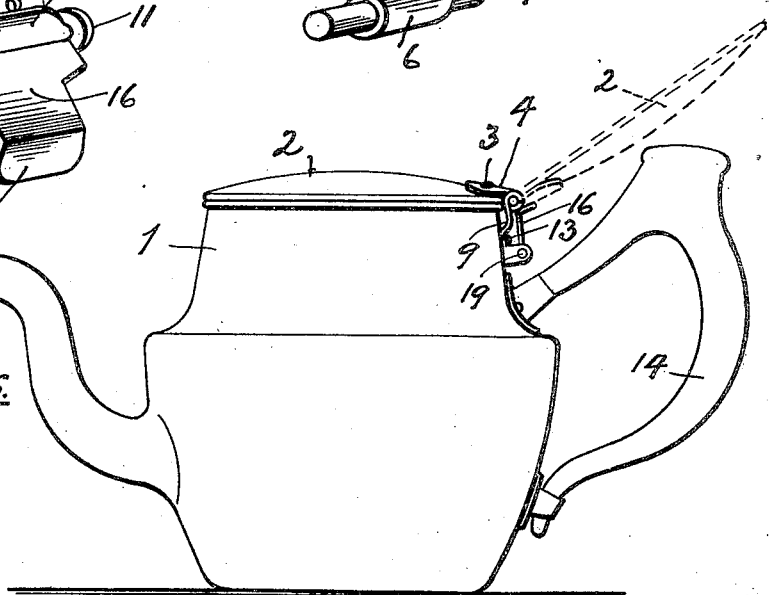

In the drawings which form a part of this specification, Figure 1, is a side elevation of my novel hinge connection, Fig. 2, a section of the same on line $x\ x$ of Fig. 3. Fig. 3, a front elevation of the same. Fig. 4, a perspective view of the same in opened position, Fig. 5, a like view of the cover section of the hinge, and Fig. 6, a side elevation of a tea pot to which my hinge is applied, showing in broken lines the cover of the receptacle at rest in open position.

Like reference characters indicate like parts throughout the views.

In the drawings 1 represents a tea pot of any desired shape or construction, and 2 a cover of any convenient shape. Fixed by rivets 3 or otherwise to the cover is a leaf or plate 4 provided, when rivets are used with rivet openings 5, and having an extended portion rolled over to form a sleeve 6 tightly holding a pintle or pin 7. If preferred the pintle 7 may be formed integral with the plate 4. A coöperating section of the hinge member comprises a plate 9 provided upon its upper margin with integral vertically disposed hook shaped fingers 10, and at each end of its lower portion with rearwardly directed ears 11. When the means for fastening this plate consist of rivets the plate 9 is provided with rivet holes 12. In the present instance this plate is fixed to the tea pot 1 by rivets 13 at a point below and below the member 4 of the cover; the fingers 10 overlapping, but not wholly inclosing the pintle 7, so that space is afforded for permitting the removal of the pintle in a downward direction. Under ordinary conditions of use the hooked fingers sufficiently inclose the pintle to prevent accidental disengagement of the cover, even when the latter is turned backwardly to a horizontal position into contact with the usual handle 14. In order, however, to insure the retention of the cover under any conditions which may arise, I provide a clamping member of a normally vertical plate 16 provided at its upper end with an outwardly bent lip 17, and at its bottom margin, with an inturned flange 18 adapted to frictionally contact with the face of plate 9. Lateral lugs or trunnions 19 upon the ends of the plate 16 enter openings 20 in ears 11 and form pivots for the clamping member. When the latter is in upright or clamped position the lip 17 rests loosely against the sleeve 6 or the pintle 7 and prevents accidental removal of the latter.

What I claim is—

1. A cover hinge comprising two plates, a pivot member upon the first plate, curved fingers upon the second plate engaging and partially inclosing the pivot member, and a clamping member pivotally mounted upon the second plate normally in contact with the pivot member.

2. The combination with the body and cover of a tea or coffee pot, of a plate upon the cover, a pivot member upon the plate, a plate upon the body, fingers upon the second plate partially overlapping the pivot member, ears upon the second plate, and a clamping member pivotally mounted in the ears in supporting contact with the pivot member.

3. The combination with the body and cover of a tea or coffee pot, of a plate upon the cover, a pivot member upon the plate, a plate upon the body, fingers upon the second plate partially overlapping the pivot member, ears upon the second plate, a clamping member pivotally mounted at its lower portion in the ears, a lip upon the upper portion of clamping member adapted to contact with the pivot member, and a flange upon the clamping member adapted to frictionally engage the second plate.

In testimony whereof I have affixed my signature in presence of two witnesses.

CHARLES G. BLOOMER, JR.

Witnesses:
HORATIO E. BELLOWS,
WALTER LOUIS FROST.